Dec. 23, 1924.

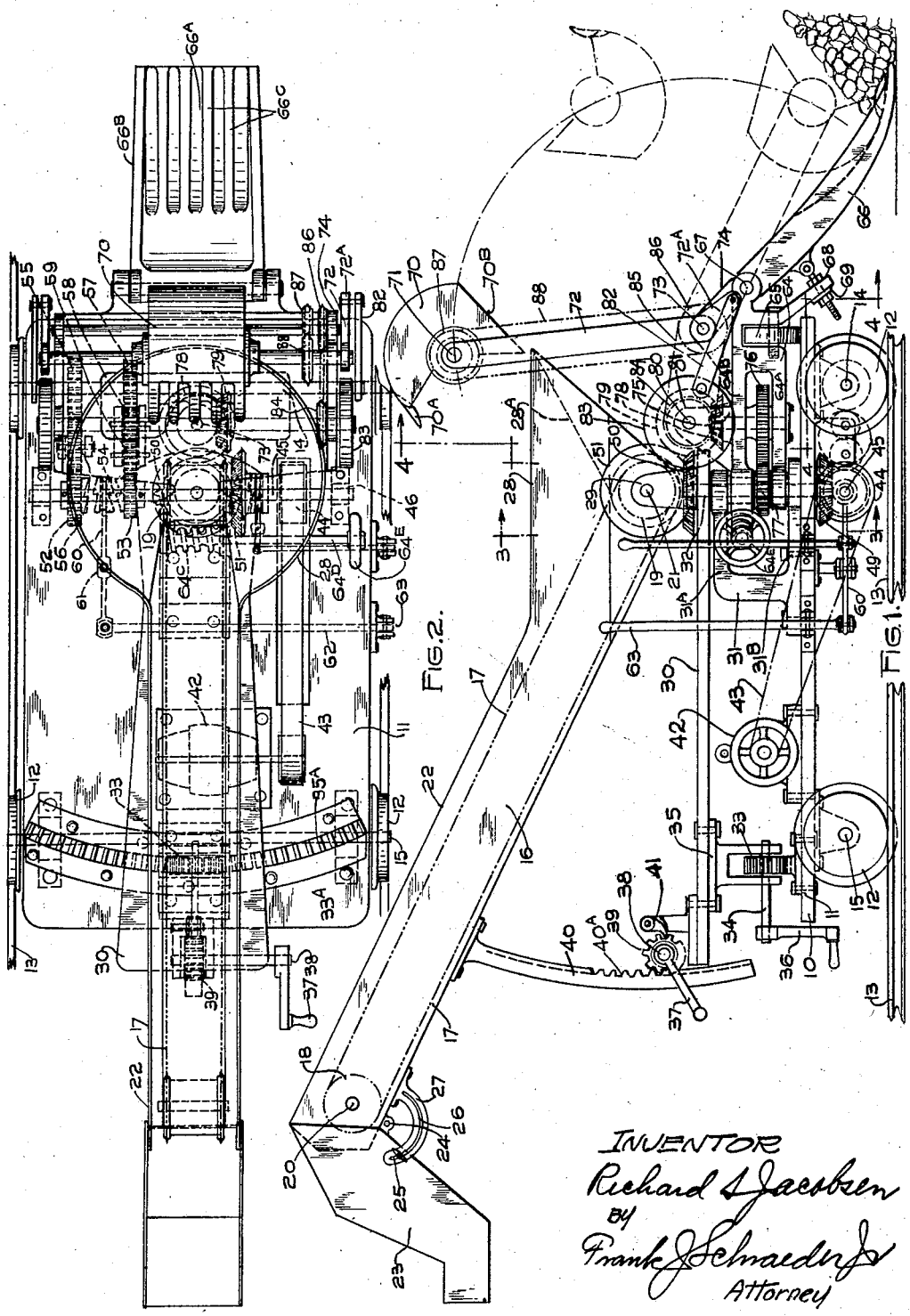

R. S. JACOBSEN

PORTABLE SHOVELING AND LOADING MACHINE

Filed April 3, 1919  4 Sheets-Sheet 2

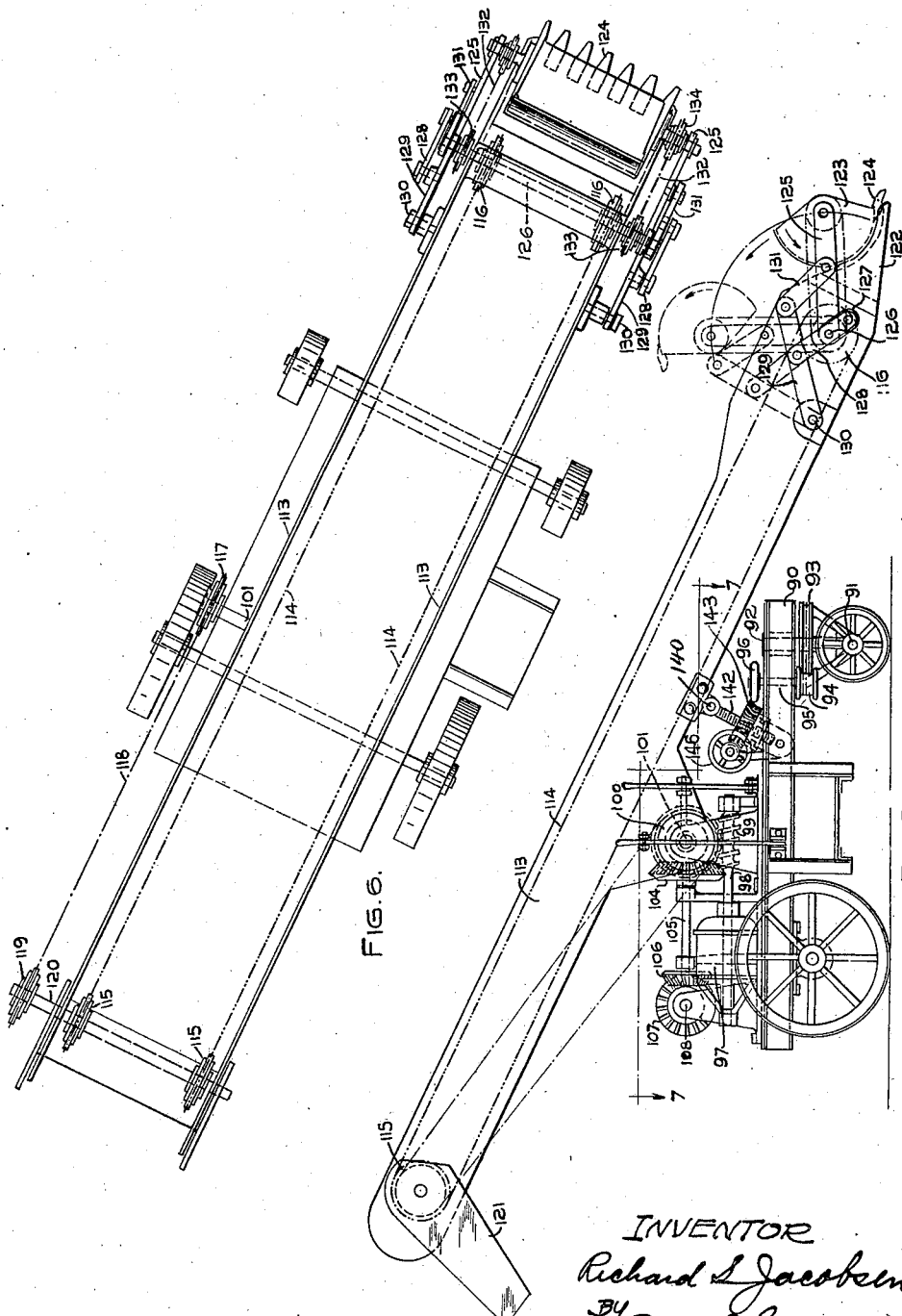

Dec. 23, 1924.

R. S. JACOBSEN 1,520,247

PORTABLE SHOVELING AND LOADING MACHINE

Filed April 3, 1919     4 Sheets-Sheet 4

INVENTOR
Richard S. Jacobsen
BY
Frank J. Schnaedler
Attorney

Patented Dec. 23, 1924.

1,520,247

UNITED STATES PATENT OFFICE.

RICHARD S. JACOBSEN, OF CHICAGO, ILLINOIS.

PORTABLE SHOVELING AND LOADING MACHINE.

Application filed April 3, 1919. Serial No. 287,150.

*To all whom it may concern:*

Be it known that I, RICHARD S. JACOBSEN, a subject of the King of Norway, residing in the city of Chicago, in the county of Cook and State of Illinois, have invented new and useful Improvements in Portable Shoveling and Loading Machines, of which the following is a specification.

The invention relates to portable shoveling and loading machines, particularly employed for handling ore, coal, or similar granular material, and adapted to remove such material in mine workings where a comparatively low head room prevents the employment of steam shovels or elevators.

It is an object of the invention to provide a machine of the character described which effects the purpose stated with great efficiency and marked rapidity.

It is a further object of the invention to provide the machine with a scoop which is adapted to oscillate and which in the execution of this movement is actuated to take a load and discharge it onto a suitable conveyer.

It is a further object of the invention to provide means for continuously imparting to the scoop an oscillatory motion and simultaneously impart to the scoop a rotary motion timed, however, to effect the taking of the load in one end position and to discharge the same in the other end position.

It is also an object of the invention to provide a scoop which is oscillated about an axis extraneous thereto and which is rotated simultaneously about its transverse axis.

A further object of the invention embraces the provision of conveying means adjustable in horizontal and vertical direction so that the discharge of the material may be directed onto a suitable and selected place.

A further object entails the provision of means for ensuring the proper discharge of the load onto the conveying means throughout the range of adjustment of the latter.

It is also an object of the invention to provide certain details of construction and arrangement of parts tending to increase the usefulness and efficiency of a machine of this particular character.

To the accomplishment of the objects stated and others that will become apparent as the description proceeds, preferred embodiments of the invention are described in the following specification, particularly pointed out in the claims forming a part thereof, and illustrated in the accompanying drawings, in which—

Fig. 1 is a side elevation of one preferred form of the machine constructed in accordance with my invention;

Fig. 2 is a top plan view of the machine;

Fig. 5 is a side elevation of another preferred form of the machine;

Fig. 6 is a top plan view of the same;

Figure 4:
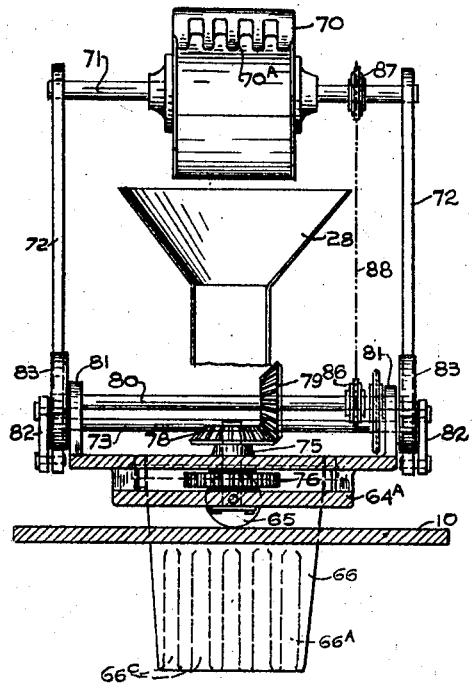
Fig. 4 is a sectional view, the section being taken on the line 4—4 of Fig. 1.
Figure 3:
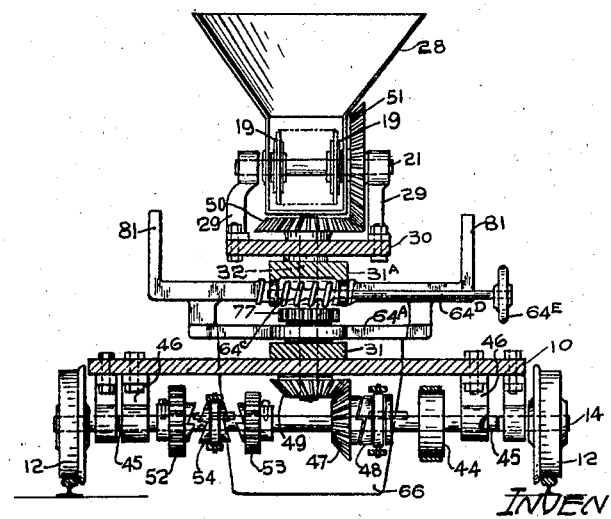
Fig. 3 is a section on the line 3—3 of Fig. 1.

Referring to the drawings, and more particularly to Figs. 1-4, the machine comprises a truck, generally designated by 10, and includes a platform 11 of rectangular construction supported on the running wheels 12, which latter are flanged to be adapted for running on rails 13. It is of course within the scope of the invention to omit the flanges of the wheels and to adapt the machine for propulsion on the ground. In the present embodiment the front wheels are keyed to an axle 14 and the rear wheels are secured to the rear axle 15. If the truck is to run on the ground the rear wheels 12 would be arranged to be steered to which end suitable steering means could be provided (see Figs. 5 and 6).

The loading conveyer 16 is constructed as an endless belt, but if preferred any other suitable type could be selected. As indicated, the conveyer comprises the double strand chains 17, which are trained around the sprocket wheels 18 and 19, arranged respectively at the upper and lower end of the conveyer. The sprocket wheels 18 are carried by a shaft 20 while the sprocket wheels 19 are keyed to a shaft 21, both shafts being journalled in bearings provided at the side walls of the conveyer body 22. To the upper end of the conveyer 16 an adjustable delivery shoe 23 is pivotally secured, as at 24, and is maintained in the required angular position relative to the conveyer by thumb screws 25 and extending through arcuate slots 26 of segmental brackets 27, fixedly secured to the bottom of the conveyer body 22. The latter terminates at the lower end in a conical receiving hopper 28, forming at the upper edge a substantially circular opening and provided with an oblique false bottom 28$^A$, whereby material discharged into the hopper is caused to slide under gravity onto the foot end of the conveyer.

The shaft 21, to which the sprocket wheels 19 are keyed, extends into bearings 29 and are secured to a small platform 30 pivotally mounted on the upper arm 31$^A$ of a casting 31, constituting a bearing for the main vertical drive shaft 32. The rear outer end of the platform 30, as indicated in Fig. 1, is provided with a depending bracket 35, rigidly secured to the bottom thereof and carrying a rotatable shaft 34, which is provided between the arms of the bracket with a pinion 33, adapted to mesh with a segmental rack 35$^A$ secured to the platform 11. A manually operated crank 36 is secured to the outer end of the shaft 34 and upon actuation of said crank, the conveyer structure may be swung about the vertical drive shaft 32 as an axis to provide for adjustment of the conveyer structure. It is obvious that the horizontal adjustment of the conveyer structure may be effected within comparatively wide limits, governed by the length of the segmental rack 33$^A$. For the vertical adjustment of the conveyer the conveyer body 22 is provided with a depending curved arm 40 constituting on the front side thereof an arcuate rack 40$^A$. A shaft 38 is supported on the platform 30 and carries a pinion 39 in engagement with said rack. The shaft 38 is provided with a small crank arm 37 and a spring-controlled pawl 41 normally prevents rotation of said pinion.

On the platform 11 an electric motor 42 is provided constituting the driving power of the machine. A transverse drive shaft 45 journalled in bearings 46, is secured to the bottom of the truck platform 11. A pulley 44 on said drive shaft registers with the motor pulley and a belt 43 is trained around the two pulleys so as to impart rotation to the drive shaft. A bevel gear 47, loosely mounted on the drive shaft 45, is in mesh with the bevel gear 49, keyed to the lower end of the vertical drive shaft 32. A clutch 48 is adapted to secure the bevel gear 47 to the transverse drive shaft 45. To the upper end of the vertical shaft 32, a bevel gear 50 is keyed, which meshes with a bevel gear 51, fast to the conveyer shaft 21 so as to impart a drive to the conveyer mechanism. In order to enable propulsion of the truck in forward or backward direction, a pair of gears 52 and 53 are loosely mounted on the shaft 45 and are adapted to be engaged by a clutch 54, splined to the shaft 45. The driving gear 52 is in operative connection with the gear 55, secured to the axle 14, by an intermediate gear, as indicated in Fig. 2. The other driving gear 53 is in operative connection with a gear 57, also secured to the axle 14 through a train of intermediate gears 58 and 59.

From the foregoing it is obvious that the movement of the clutch lever 60 controlling the clutch 54 about its pivot 61, will cause the selective engagement of the clutch 54 with either of the gears 52 or 53, whereby the axle 14 and the wheels 12, and therewith the entire vehicle, may be propelled in either forward or backward direction. The lever 60 is actuated by the hand lever 63, which is connected to the lever 60 by a link 62, as indicated in Fig. 2.

The shoveling mechanism comprises a movable frame 64 terminating in spaced arms 64$^A$ and 64$^B$, formed at the inner ends with hubs to surround the vertical drive shaft 32. As indicated in Fig. 1, the spaced arms of the frame 64 are interposed between the spaced arms of the frames 31. The frame 64 is undercut to provide a recess for the reception of a roller 65 bearing on the truck platform 11. To the frame 64, at the outer end, a shoe 66 is pivotally secured, as at 67. The shoe 66 may be adjusted in vertical direction about the pivot bolt 67 by an arm 68, articulated with the shoe 66 and projecting through an apertured arm 69, depending from the arm 64$^B$, the protruding end of the arm 68 being provided with a nut to adjustably hold the shoe in adjusted position. The frame 64 may be swung about the vertical drive shaft as pivotal center together with the shoe and other associated parts. To accomplish this oscillation of the shoe or adjustment of the latter, the hub formed at the inner end of the arm 64$^B$ is formed with teeth which are adapted to be engaged by a worm 64$^C$, provided at the end of a horizontal shaft 64$^D$, which is suitably supported in any desired manner and which at the upper end carries a hand wheel 64$^E$. From the foregoing it is obvious that upon rotation of the hand wheel 64$^E$ the frame 64 together with the shoe 66, the arm 72, and the scoop 70 may be oscillated about the vertical drive shaft 32 within comparatively wide limits so as to conveniently reach the material heap on the floor. The shoe 66 is equipped with a curved bottom 66$^A$, side walls 66$^B$, and with a plurality of ribs 66$^C$ extending from the bottom upwardly.

When the shoe is forced under a heap body of material prior to the actuation of the scoop 70, a large piece of material will rest on the upright ribs 66ᶜ, so that the spaced teeth 70ᴬ of the scoop 70 are able to enter underneath the material between the ribs and thus avoid frontal engagement between the scoop teeth and a large piece of material.

The scoop 70 comprises a substantially semi-circular body portion having a flat back 70ᴮ, and is rigidly secured to a spindle 71 loosely mounted in two parallel arms 72 rotatably secured on a shaft 73, which is journalled in brackets 74 on top of the frame 64. A vertical shaft 75 is journalled in the arms 64ᴬ and 64ᴮ of the frame 64 and carries a gear 76, keyed thereto, in mesh with a gear 77, fast to the vertical drive shaft 32. At the upper end of the shaft 75 a bevel gear 78 meshes with the bevel gear 79 of a transverse shaft 80, loosely mounted in brackets 81 on top of the frame 64. The parallel arms 72 are provided with short angularly disposed extensions 72ᴬ, the ends of which are articulated with a link 82 pivotally secured at the outer end to a crank disk 83. The latter is keyed to the transverse shaft 80. The shaft 80 carries a sprocket wheel 84 and a chain 85 is trained around the sprocket wheel 84 and the sprocket wheel 86 arranged on the shaft 73. The endless transmission belt 88 is trained around the sprocket wheels 87 and 89 respectively secured to the shafts 73 and 71.

The operation of the machine is as follows: The shaft 80 is rotated by virtue of the engagement of its bevel gear 79 with the bevel gear 78, mounted at the upper end of the vertical shaft 75, the rotation of which is derived from the main vertical shaft 32. Upon rotation of the crank disks 83, the links 72ᴬ and consequently the arms 72 are oscillated about the shaft 73 as a pivotal center so that the scoop is forced to oscillate between the topmost position, shown in Fig. 1 in solid lines, to the lowermost end position indicated in dotted lines. The continuous rotation of the shaft 80 causes a continuous actuation of the transmission belts 85 and 88, and consequently will ensure a continuous rotation of the scoop 70 about the pin 71 as a pivot. It is thus evident that during oscillation of the scoop it will simultaneously carry out a continuous rotary motion and the actuating mechanism is so timed and the scoop is so arranged that the teeth portion 78 will enter the space between the ribs 66ᶜ of the shoe 66 when the arms 72 have reached the lowermost end position. During the upward travel of the arms 72, the scoop 70 will be gradually rotated, as is indicated in dotted lines, for an intermediate position. When the arm 72 has reached the topmost position the scoop will be so turned that the teeth 70ᴬ will open rearwardly, as indicated in Fig. 1, in which position the contents are discharged into the hopper 28 of the conveyer mechanism. By virtue of the conical form of the hopper 28 and the circular inlet opening with which it is provided at the top, it is obvious that a proper discharge of the material onto the conveyer is assured irrespective of any adjustment to which the conveyer structure has been subjected. The provision of the inclined false bottom 28ᴬ furthermore ensures that the material will reach the foot end of the conveyer in the proper direction.

Figures 7, 8:
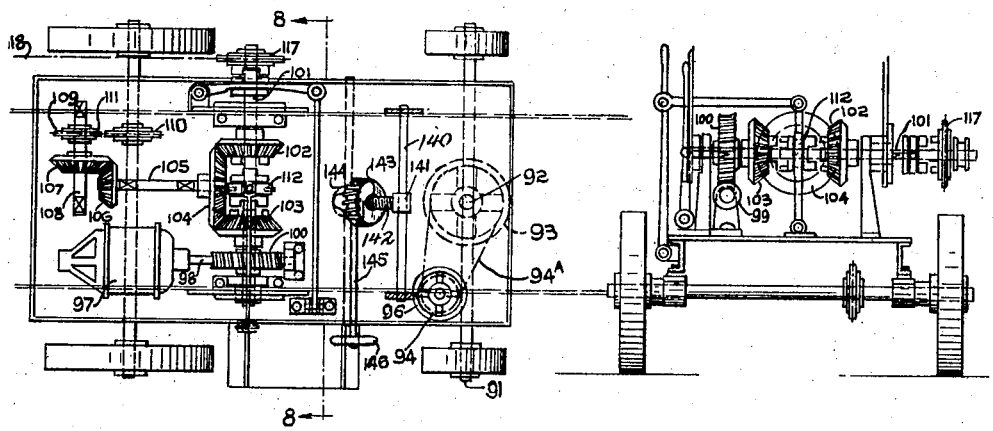
Fig. 7 is a sectional view of the platform of the machine and the parts supported thereon, the section being taken on the line 7—7 of Fig. 5.
Fig. 8 is a section on the line 8—8 of Fig. 7.

In Figs. 5-8 a second modification of the invention is illustrated and as shown the machine comprises the wheeled platform 90, which is adapted to be propelled on the ground without the employment of rails. To provide for the necessary steering of the vehicle, the front axle 91 is pivotally mounted, as at 92, there being a steering or so-called fifth wheel 93 provided which is connected with a pulley 94 by a belt 94ᴬ, said pulley being arranged at the lower end of the vehicle shaft 95, carrying at its upper end a hand wheel 96, whereby the necessary steering of the vehicle may be effected. The propelling power of the vehicle is derived from a motor 97 which has a prolonged shaft 98, on which a worm 99 meshes with a gear 100, secured to a horizontal transverse shaft 101. The latter carries, as indicated in Fig. 7, a pair of bevel gears 102 and 103, respectively, loosely mounted thereon, which mesh with a large bevel gear 104, keyed to a short longitudinal shaft 105, carrying at its rear end a bevel gear 106 in mesh with a gear 107, mounted on a transverse shaft 108. The latter is supported in bearings on the platform 90. A sprocket wheel 109 is in vertical alignment with a sprocket 110, secured to the rear axle of the vehicle, and a transmission belt 111 is trained around the sprocket wheels 109 and 110 to thereby impart a rotary motion to the rear axle. The arrangement of the bevel gears 102 and 103 serves the purpose of imparting rearward and forward drive to the vehicle as the gears are loosely mounted on the shaft 101, and a coupling 112, splined to the shaft, may be placed in selective engagement with the bevel gears 102 and 103 to thereby impart a rearward or forward drive to the vehicle.

The conveyer mechanism comprises a conveyer body 113, which is pivotally mounted on the transverse shaft 101. Thus the conveyer may be oscillated in vertical direction about the shaft 101 as a pivot. To accomplish this a rod 140 is secured to the bottom of the conveyer body and a sleeve 141 is arranged thereon which is formed integral with a depending rod 142 entering with the lower end thereof a bearing and provided with screw threads throughout its length.

The rod 142 carries a worm wheel 143 rotatably secured to the bearing and with which meshes a worm 144 of a horizontal shaft 145, carrying at the outer end a hand wheel 146. The conveyer proper comprises an endless belt 114 trained around the head sprocket wheels 115 and the foot sprocket wheels 116. A sprocket wheel 117 is secured to the transverse shaft 101 and an endless chain 118 encompasses the sprocket wheel 117 and a sprocket wheel 119 secured to the protruding end of the shaft 120, which carries the sprocket wheels 115. Thus it will be seen that the motor 97 imparts a drive to the transverse shaft 101 and mediately to the rear axle of the vehicle and the transverse shaft 101 serves also as a drive shaft for the conveyer 114. A discharge spout 129 is pivotally secured to the head end of the conveyer. The lower part of the conveyer has secured thereto a shoe portion 122, which is of a construction similar to the shoe 66 so that further reference thereto is deemed superfluous.

The scoop 123, adapted to enter with its teeth 124 between the upright ribs of the shoe 122, is arranged at the end of arms 125, which are pivotally mounted on the axle 126, carrying the foot sprocket wheels 116. The axle 126 is provided with a crank 127 at either end, connected to a link 128, articulated with an arm 129 intermediate the ends thereof. The arm 129 is pivotally secured to the conveyer body 113, as at 130, and pivotally secured at the outer end to a link 131, the other end of which is pivotally secured to the arm 125, intermediate the ends thereof. Thus it will be seen that upon rotation of the shaft 126, the crank 127 will cause the link 128 to execute a reciprocating motion, whereby the scoop is oscillated from the position shown in solid lines in Fig. 5 to the position shown in dotted lines and vice versa. An endless chain 132 is trained around sprocket wheels 133 arranged on the ends of the shaft 126 so that in addition to the oscillation of the scoop, the latter executes a continuous rotary movement identical with the movement described with respect to the first modification. The operation of the device is similar to the one discussed in connection with the first described embodiment and will be readily understood.

Thus the scoop 70 moves upward in front of the transverse axis 73 to carry the load to discharging position. The scoop moves from loading position to receive the load and continues, without reversal of movement, on its way upward to reach the dumping position over said axis about which it swings up and down.

While the drawings disclose preferred embodiments of the invention, they are of course merely indicative of the principle on which the invention is predicated. Various changes and alterations may be made by those versed in the art and it is my intention not to limit myself to the specific construction as shown in the preferred embodiments, but to avail myself of all modifications constituting departures within the scope of the invention as defined by the following claims.

From the foregoing, it will be seen that, as shown in either Fig. 2 or Fig. 5, the scoop and the swinging support upon which it is mounted have rotational movement in the same direction. As shown and described, the machine is forced forward to drive or push the scoop into a heap of materials on the ground, and the rotational movement of both the scoop and its swinging support is in a backward direction, so that in this way the load is carried first upwardly and then backwardly to a point directly over the transverse axis of the swinging support, in order to reach the desired point of discharge. The fork prongs 66$^C$ cooperate, as explained, with the fork prongs 70$^A$ of the scoop to facilitate loading of the scoop.

Of course, the adjustable conveyor and the scoop with its actuating mechanism are always in operative relation to each other, in either form of the invention, inasmuch as both the conveyor and its scoop and its actuating mechanism are movable laterally, whereby the conveyor and the scoop may extend in the desired direction for the operation thereof. In any adjustment of the conveyor and scoop the latter is movable from a forward and lower position to a rearward and upper position, in the operation of lifting a load from the ground to the hopper of the conveyor. Also, of course, the conveyor has adjustment by up and down motion thereof, and by lateral motion thereof, in either form of the invention and this is also true of the scoop.

I claim:

1. In a machine of the class described, in combination in a unitary structure, conveying means, a scoop arranged forwardly thereof, means for oscillating said scoop from a forward and lower position to a rearward and upper position, about a transverse axis in rear of the loading position of the scoop, so that the scoop swings upward in front of said axis to reach the discharging position, and for at the same time rotating said scoop to take the load and discharge the same onto the conveying means, said scoop and said other elements of said unitary structure being organized in operative relation whereby said scoop has the arc of a circle as its entire path of travel from its loading position to its discharging position.

2. In a machine of the class described, in combination in a unitary structure, conveying means, a scoop arranged forwardly thereof, means for oscillating said scoop from a forward to a backward position by a continuous movement first upwardly and then rearwardly, and for continuously rotating said scoop to take a load and discharge the same onto the conveying means, said scoop and said other elements of said unitary structure being organized in operative relation whereby said scoop has the arc of a circle as its entire path of travel from its loading position to its discharging position.

3. In a machine of the class described, in combination in a unitary structure, conveying means, a scoop arranged forwardly thereof, and means for moving said scoop one movement first upwardly and then rearwardly and simultaneously therewith rotating the scoop to take a load and discharge it onto said conveying means, said scoop and said other elements of said unitary structure being organized in operative relation whereby said scoop has the arc of a circle as its entire path of travel from its loading position to its discharging position.

4. In a machine of the class described, in combination in a unitary structure, conveying means, a scoop arranged forwardly thereof, and means for oscillating and simultaneously rotating said scoop, so that the scoop while rotating moves directly upward from the loading position thereof in starting toward the discharging position, said scoop and actuating means being arranged and timed to cause the scoop to take the load and discharge it onto the conveying means, said scoop and said other elements of said unitary structure being organized in operative relation whereby said scoop has the arc of a circle as its entire path of travel from its loading position to its discharging position.

5. In a machine of the class described, in combination in a unitary structure, conveying means, a scoop arranged forwardly thereof, means for oscillating and simultaneously rotating said scoop, so that the scoop has one continuous movement from loading to discharging position, said scoop and actuating means being arranged and timed to cause said scoop to take a load and discharge it onto said conveying means, and means for controlling said machine, said scoop and said other elements of said unitary structure being organized in operative relation whereby said scoop has the arc of a circle as its entire path of travel from its loading position to its discharging position.

6. In a machine of the class described, in combination in a unitary structure, conveying means, a scoop arranged forwardly thereof, and means for imparting an oscillating movement to said scoop about an extraneous axis, so that the scoop oscillates in front of and above said axis, and has a rotary movement about the transverse axis of said scoop, said scoop and said other elements of said unitary structure being organized in operative relation whereby said scoop has the arc of a circle as its entire path of travel from its loading position to its discharging position.

7. In a machine of the class described, in combination in a unitary structure, conveying means, a scoop arranged forwardly thereof, and means for rotating said scoop about its transverse axis and at the same time moving said scoop by one continuous movement from a loading to a discharging position to gather a load and to deposit the same onto said conveying means, said scoop and said other elements of said unitary structure being organized in operative relation whereby said scoop has the arc of a circle as its entire path of travel from its loading position to its discharging position.

8. In a machine of the class described, in combination in a unitary structure, a scoop and means for rotating said scoop about its transverse axis and at the same time moving said scoop by one continuous movement from a loading to a discharging position to gather a load and to carry the same to the point of discharge, said scoop and said other elements of said unitary structure being organized in operative relation whereby said scoop has the arc of a circle as its entire path of travel from its loading position to its discharging position.

9. In a machine of the class described, in combination in a unitary structure, a scoop and means for rotating said scoop about its transverse axis and oscillating said scoop about an extraneous axis to gather and carry the load by one continuous movement from loading position to discharging position, said scoop and said other elements of said unitary structure being organized in operative relation whereby said scoop has the arc of a circle as its entire path of travel from its loading position to its discharging position.

10. In a machine of the class described, in combination in a unitary structure, a scoop and means for continuously rotating said scoop about its transverse axis and oscillating said scoop about an extraneous axis, so that the scoop is carried from a point in advance of said extraneous axis to a position above the latter, said scoop and said other elements of said unitary structure being organized in operative relation whereby said scoop has the arc of a circle as its entire path of travel from its loading position to its discharging position.

11. In a machine of the class described, in combination in a unitary structure, a scoop and means for continuously rotating said scoop about its transverse axis and continuously oscillating said scoop about an extraneous axis, so that the scoop is carried from a point in advance of said extraneous axis to a position above the latter, said scoop and said other elements of said unitary structure being organized in operative relation whereby said scoop has the arc of a circle as its entire path of travel from its loading position to its discharging position.

12. In a machine of the class described, in combination in a unitary structure, a pair of forwardly extending spaced arms, a scoop movably supported by the front ends of said arms, means for imparting an oscillating movement to said arms, about a transverse axis, so that the arms swing upward and then backward, and means for actuating said scoop to take a load and discharge the same, whereby the scoop moves upward in front of said axis to reach the discharge position thereof; said scoop and said other elements of said unitary structure being organized in operative relation whereby said scoop has the arc of a circle as its entire path of travel from its loading position to its discharging position.

13. In a machine of the class described, in combination in a unitary structure, a pair of forwardly extending spaced arms, a scoop pivotally supported by the front ends of said arms to swing about a transverse axis, means for imparting an oscillating movement to said arms, so that the latter swing upwardly and then backwardly, and means for rotating said scoop to take a load and discharge the same, said scoop and said other elements of said unitary structure being organized in operative relation whereby said scoop has the arc of a circle as its entire path of travel from its loading position to its discharging position.

14. In a machine of the class described, in combination in a unitary structure, a pair of forwardly extending spaced arms, a scoop pivotally supported by the front ends of said arms, means for imparting an oscillating movement to said arms about a transverse axis, so that the latter swing upwardly and then backwardly, and means for continuously rotating said scoop to take a load in one position of said arms and discharge the load in the other position of said arms, whereby the scoop moves upward in front of said axis to reach the discharge position thereof, said scoop and said other elements of said unitary structure being organized in operative relation whereby said scoop has the arc of a circle as its entire path of travel from its loading position to its discharging position.

15. In a machine of the class described, in combination in a unitary structure, a pair of pivotally supported and forwardly extending arms, a scoop pivotally supported by the front ends of said arms, means for imparting oscillating movement to said arms about a transverse axis, so that the latter swing upwardly and then backwardly, and means for continuously rotating said scoop, whereby the scoop moves upward in front of said axis to reach the discharge position thereof, said scoop and said other elements of said unitary structure being organized in operative relation whereby said scoop has the arc of a circle as its entire path of travel from its loading position to its discharging position.

16. In a machine of the class described, in combination in a unitary structure, a pair of pivotally supported and forwardly extending arms, a scoop pivotally supported by the front ends of said arms, means for imparting oscillating movement to said arms about a transverse axis, so that the latter swing upwardly and then backwardly, means for continuously rotating said scoop to take a load and discharge the same, whereby the scoop moves upward in front of said axis to reach the discharge position thereof, and a conveyor in rear of said axis to receive the discharged load, said scoop and said other elements of said unitary structure being organized in operative relation whereby said scoop has the arc of a circle as its entire path of travel from its loading position to its discharging position.

17. In a machine of the class described, in combination in a unitary structure, a pair of pivotally supported and forwardly extending arms, a scoop pivotally supported by the front ends of said arms, means for imparting oscillating movement to said arms about a transverse axis, so that the latter swing upwardly and then backwardly, means for continuously rotating said scoop to take and discharge a load, whereby the scoop moves upward in front of said axis to reach the discharge position thereof, and an adjustable conveyor in rear of said axis to receive the discharged load, said scoop and said other elements of said unitary structure being organized in operative relation whereby said scoop has the arc of a circle as its entire path of travel from its loading position to its discharging position, and the scoop and its said actuating mechanism being also adjustable laterally, whereby the conveyor and scoop may extend in the desired direction for the operation thereof.

18. In a machine of the class described, in combination in a unitary structure, a pair of pivotally supported and forwardly extending arms, a scoop pivotally supported by the front ends of said arms, means for imparting oscillating movement to said arms about a transverse axis, so that the latter swing upwardly and then backwardly, means for continuously rotating said scoop to take and discharge a load, whereby the scoop moves upward in front of said axis to reach the discharge position thereof, and a conveyor adjustable by up and down motion and horizontally in rear of said axis to receive the discharged load, said scoop and said other elements of said unitary structure being organized in operative relation whereby said scoop has the arc of a circle as its entire path of travel from its loading position to its discharging position, and the scoop and its said actuating mechanism being also adjustable laterally, whereby the conveyor and scoop may extend in the desired direction for the operation thereof.

19. In a machine of the class described, in combination in a unitary structure, a pair of pivotally supported and forwardly extending arms, a scoop pivotally supported by the front ends of said arms, means for imparting oscillating movement to said arms about a transverse axis, so that the latter swing upwardly and then backwardly, means for continuously rotating said scoop to take and discharge a load, whereby the scoop moves upward in front of said axis to reach the discharge position thereof, a conveyor adjustable by up and down motion and horizontally in rear of said axis, and a hopper for directing the discharged load onto said conveyor, said scoop and said other elements of said unitary structure being organized in operative relation whereby said scoop has the arc of a circle as its entire path of travel from its loading position to its discharging position.

20. In a machine of class described, in combination in a unitary structure, a pair of pivotally supported and forwardly extending arms, a scoop pivotally supported by the front ends of said arms, means for imparting oscillating movement to said arms about a transverse axis, so that the latter swing upwardly and then backwardly, means for continuously rotating said scoop to take and discharge a load, whereby the scoop moves upward in front of said axis to reach the discharge position thereof, a conveyor adjustable by up and down motion and horizontally in rear of said axis, and a hopper presenting a circular inlet opening to said scoop when the latter occupies a discharging position, said scoop and said other elements of said unitary structure being organized in operative relation whereby said scoop has the arc of a circle as its entire path of travel from its loading position to its discharging position, and the scoop and its said actuating mechanism being also adjustable laterally, whereby the conveyor and scoop may extend in the desired direction for the operation thereof.

21. In a machine of the class described, in combination in a unitary structure, a pair of pivotally supported and forwardly extending arms, a scoop pivotally supported by the front ends of said arms, means for imparting oscillating movement to said arms about a transverse axis, so that the latter swing upwardly and then backwardly, means for continuously rotating said scoop to take and discharge a load, whereby the scoop moves upward in front of said axis to reach the discharge position thereof, a conveyor adjustable by up and down motion and horizontally in rear of said axis, and a hopper presenting a circular inlet opening to said scoop and having an inclined bottom to direct the load onto said conveyor, said scoop and said other elements of said unitary structure being organized in operative relation whereby said scoop has the arc of a circle as its entire path of travel from its loading position to its discharging position, and the scoop and its said actuating mechanism being also adjustable laterally, whereby the conveyor and scoop may extend in the desired direction for the operation thereof.

22. In a machine of the class described, in combination in a unitary structure, a pair of pivotally supported and forwardly extending arms, a scoop pivotally supported by the front ends of said arms, means for continuously rotating said scoop to take and discharge a load, a conveyor adjustable by up and down motion and horizontally, a hopper presenting a circular inlet opening to said scoop, and means for imparting oscillating movement to said arms, so that the latter swing upwardly and then backwardly, said means including an extension of said arms beyond the pivotal support and reciprocating elements acting on the free end of said extension, said scoop and said other elements of said unitary structure being organized in operative relation whereby said scoop has the arc of a circle as its entire path of travel from its loading position to its discharging position, and the scoop and its said actuating mechanism being also adjustable laterally, whereby the conveyor and scoop may extend in the desired direction for the operation thereof.

23. In a machine of the class described, in combination in a unitary structure, a pair of pivotally supported and forwardly extending arms, a scoop pivotally supported by the front ends of said arms, means for continuously rotating said scoop to take and discharge a load, a conveyor adjustable by up and down motion and horizontally, a hopper presenting a circular inlet opening to said scoop, and means for imparting an oscillating movement to said arms, so that the latter swing upwardly and then backwardly, said means including an extension of said arms beyond the pivotal support thereof, a drive shaft, a crank disk fast on said drive shaft, and a pitman connecting the free end of said arm extension to said crank disk, substantially as described, and the scoop and its said actuating mechanism being also adjustable laterally, whereby the conveyor and scoop may extend in the desired direction for the operation thereof.

24. In a machine of the class described, in combination in a unitary structure, a pivotally supported and forwardly extending frame, a pair of arms yieldingly secured thereto, a scoop rotatably supported by said arms, means for imparting oscillating movement to said arms about a transverse axis, so that the latter swing upwardly and then backwardly, means for continuously rotating said scoop to take and discharge a load, whereby the scoop rotates while traveling upward in front of said axis, an adjustable conveyor adapted to receive the discharged load, and means for adjusting said frame, said scoop and said other elements of said unitary structure being organized in operative relation whereby said scoop has the arc of a circle as its entire path of travel from its loading position to its discharging position.

25. In a machine of the class described, in combination in a unitary structure, a frame supported to swing about a transverse axis, a pair of arms articulated with said frame, a scoop rotatably supported by said arms, a shoe pivotally secured to said frame and adapted to rest on the ground, means for imparting oscillating movement to said arms about a transverse axis, so that the latter swing upwardly and then backwardly, means for continuously rotating said scoop to take on a load collected on said shoe and discharge the same, whereby the scoop rotates while traveling upward in front of said axis, an adjustable conveyor for receiving the discharged load, and means for adjusting said frame, the scoop and its actuating mechanism being also adjustable laterally, whereby the conveyor and scoop may extend in the desired direction for the operation thereof.

26. In a machine of the class described, in combination in a unitary structure, a pivotally supported frame, a pair of arms pivotally secured thereto, a scoop having a plurality of spaced teeth at its operative edge and being rotatably supported by said arms, a shoe having a plurality of spaced upstanding ribs on its upper side and being pivotally secured to said frame to rest with the lower end on the ground, means for imparting oscillating movement to said arms about a transverse axis, so that the latter swing upwardly and then backwardly, means for continuously rotating said scoop to enter with its teeth between the upstanding ribs of said shoe to take the load collected on said ribs and to discharge the load, whereby the scoop rotates while traveling upward in front of said axis, an adjustable conveyor for receiving the discharged load, and means for adjusting said frame, said scoop and its said actuating mechanism being also adjustable laterally, whereby the conveyor and scoop may extend in the desired direction for the operation thereof.

27. In a machine of the class described, organized to form a unitary structure, the combination of a supporting member mounted to swing about a horizontally disposed axis, a scoop pivoted on said member to rotate about a horizontally disposed axis, means to force the machine forward to push said scoop into a heap of materials on the ground, and instrumentalities for giving said member upward and backward rotational movement about its axis, and for at the same time causing said scoop to have backward rotational movement about its axis while rising in front of said other axis, so that they both have backward rotational movement while the load in the scoop is being carried upward to the desired point of discharge, the scoop being thus mounted to reach the discharge position thereof over the arc of a circle, as the entire path of travel thereof, in combination with means to receive the load from the scoop.

28. The structure specified in claim 27, said scoop having fork prongs, in combination with means adapted to rest on the ground for co-operation with said prongs to facilitate the filling of the scoop.

29. The structure specified in claim 27, the discharging position of the scoop being directly above the transverse axis of said member.

30. In a machine of the class described, the combination of a supporting member mounted to swing about a horizontally disposed axis, a body frame having means to hold said axis in fixed relation thereon, a scoop pivoted on said member to rotate about a horizontally disposed axis, and instrumentalities whereby said member and scoop have rotational movement in the same direction while the scoop is traveling the arc of a circle from loading position to the discharging position thereof.

31. In a machine of the class described, the combination of a scoop having fork prongs at the front edge thereof, a shovel adapted to rest on the ground and having means for co-operation with said prongs to facilitate the loading of the scoop, in combination with means for operating said scoop to carry the load upward from said shovel to the desired point of discharge.

32. The combination of means to provide a transverse axis, a scoop mounted to rotate about a transverse axis, means to move the last mentioned axis upward about and in front of the first mentioned axis, so that the scoop rises from loading position to dumping position thereof, by following the arc of a circle only, and means for rotating said scoop about its own axis while it moves upward in front of said first mentioned axis.

33. A structure as specified in claim 32, and means resting on the ground to limit the return movement of the scoop to said loading position.

34. A structure as specified in claim 32, in combination with means to push the scoop forward in said loading position thereof.

In witness whereof, I have hereunto subscribed my name this 28th day of March, 1919.

RICHARD S. JACOBSEN.